(12) United States Patent
Shibasaki

(10) Patent No.: US 11,543,623 B2
(45) Date of Patent: Jan. 3, 2023

(54) LENS APPARATUS AND IMAGE PICKUP APPARATUS

(71) Applicant: CANON KABUSHIKI KAISHA, Tokyo (JP)

(72) Inventor: Go Shibasaki, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 92 days.

(21) Appl. No.: 17/125,763

(22) Filed: Dec. 17, 2020

(65) Prior Publication Data

US 2021/0199916 A1 Jul. 1, 2021

(30) Foreign Application Priority Data

Dec. 26, 2019 (JP) .............................. JP2019-236837

(51) Int. Cl.
*G02B 7/10* (2021.01)

(52) U.S. Cl.
CPC ....................................... *G02B 7/10* (2013.01)

(58) Field of Classification Search
CPC .................................... G02B 7/10; G02B 7/04
See application file for complete search history.

(56) References Cited

U.S. PATENT DOCUMENTS 4,950,061 A * 8/1990 Tsurukawa ............... G02B 7/10
396/79

FOREIGN PATENT DOCUMENTS

JP 2008046440 A 2/2008

* cited by examiner

*Primary Examiner* — James C. Jones
(74) *Attorney, Agent, or Firm* — Canon U.S.A., Inc. IP Division

(57) ABSTRACT

A lens apparatus includes an optical element, first and second fixed barrels coupled to each other, a conversion mechanism from a rotary motion to a linear motion, fitted to the first fixed barrel and configured to be rotated about a first axis as an axis of the first fixed barrel to drive the optical element along the first axis, an operation member fitted to an outer periphery of the second fixed barrel and configured to be operated to be rotated about a second axis as an axis of the second fixed barrel, and a transmission ring, supported by the conversion mechanism to be translatable in a first direction orthogonal to the first axis and by the operation member to be translatable in a second direction and orthogonal to the second axis, configured to transmit rotation from the operation member to the conversion mechanism.

20 Claims, 5 Drawing Sheets

LENS APPARATUS AND IMAGE PICKUP APPARATUS

BACKGROUND OF THE DISCLOSURE

Field of the Disclosure

The aspect of the embodiments relates to a lens apparatus and an image pickup apparatus.

Description of the Related Art

A lens apparatus including an annular operation member that is rotatable about an optical axis and a rotary-to-linear motion conversion mechanism that rotates about the optical axis to linearly move an optical element along the optical axis is known. The annular operation member and the rotary-to-linear motion conversion mechanism are coupled by a coupling member, and the annular operation member is rotated for focusing or magnification. Japanese Patent Application Laid-Open No. 2008-46440 discusses a lens apparatus including a driving ring (rotary-to-linear motion conversion mechanism) that is fitted onto an outer periphery of a fixed ring and includes a cam and a lead screw for linearly moving an optical element, and an operation ring (annular operation member) that can be operated to rotate around the outer periphery of the fixed ring. The driving ring is firmly coupled to the operation ring by a collar and a screw.

In the lens apparatus discussed in Japanese Patent Application Laid-Open No. 2008-46440, the rotary-to-linear motion conversion mechanism and the operation member rotate integrally. However, the rotary-to-linear motion conversion mechanism and the operation member may be axially misaligned because of manufacturing variations and assembly variations of the parts. This makes torque for rotating the operation member uneven and may cause a nonuniform operation feeling even if both the rotary-to-linear motion conversion mechanism and the operation member are fitted to a fixed barrel. The nonuniform operation feeling may be more noticeable if the part of the fixed barrel to which the rotary-to-linear motion conversion mechanism is fitted is different from that to which the operation member is fitted.

The operation torque can be made even by increasing fitting play (radial play) between the operation member and the fixed barrel. This eliminates the nonuniformity of the operation feeling due to the operation torque, whereas operability is impaired by the radial play. Meanwhile, increasing fitting play between the rotary-to-linear motion conversion mechanism and the fixed barrel may lower the optical performance of the lens apparatus because parallel eccentricity and tilt eccentricity of the optical element to be driven occur.

SUMMARY OF THE DISCLOSURE

An aspect of embodiments provides, for example, a lens apparatus beneficial in an operability and an optical performance.

According to an aspect of embodiments, a lens apparatus includes an optical element, a first fixed barrel, a second fixed barrel coupled to the first fixed barrel, a conversion mechanism from a rotary motion to a linear motion, fitted to the first fixed barrel and configured to be rotated about a first axis as an axis of the first fixed barrel to drive the optical element along the first axis, an operation member fitted to an outer periphery of the second fixed barrel and configured to be operated to be rotated about a second axis as an axis of the second fixed barrel, and a transmission ring configured to transmit rotation from the operation member to the conversion mechanism, the transmission ring being supported by the conversion mechanism to be translatable in a first direction orthogonal to the first axis and supported by the operation member to be translatable in a second direction and orthogonal to the second axis.

Further features of the disclosure will become apparent from the following description of exemplary embodiments with reference to the attached drawings.

DESCRIPTION OF THE EMBODIMENTS

Figure 1:
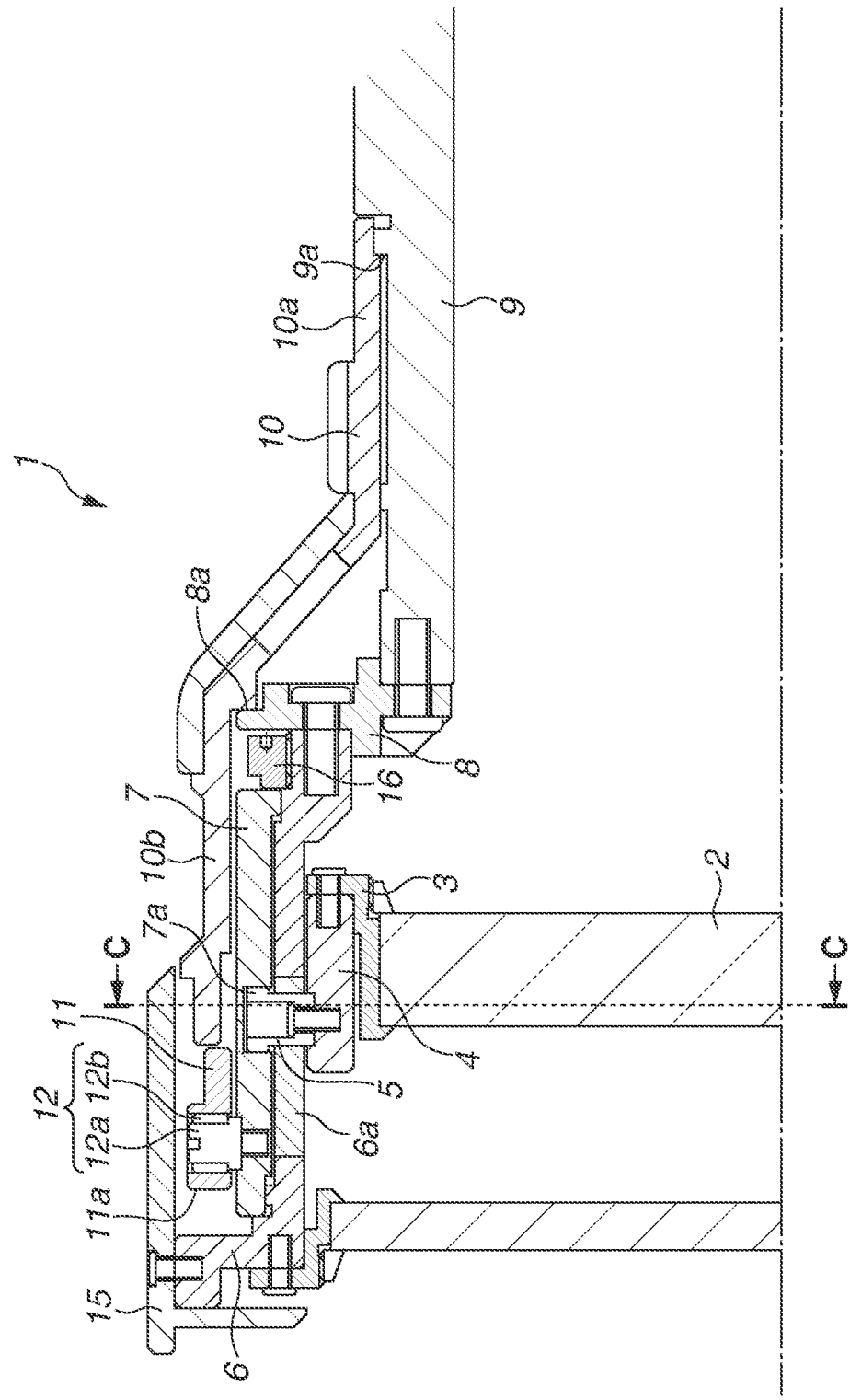
FIG. 1 is a sectional view illustrating a configuration example of a lens apparatus according to a first exemplary embodiment.

Exemplary embodiments of the disclosure will be described below with reference to the accompanying drawings. Throughout the drawings for describing the exemplary embodiments, similar members are denoted by the same reference numerals in principle (unless otherwise specified). A redundant description thereof will be omitted.

Figure 2:
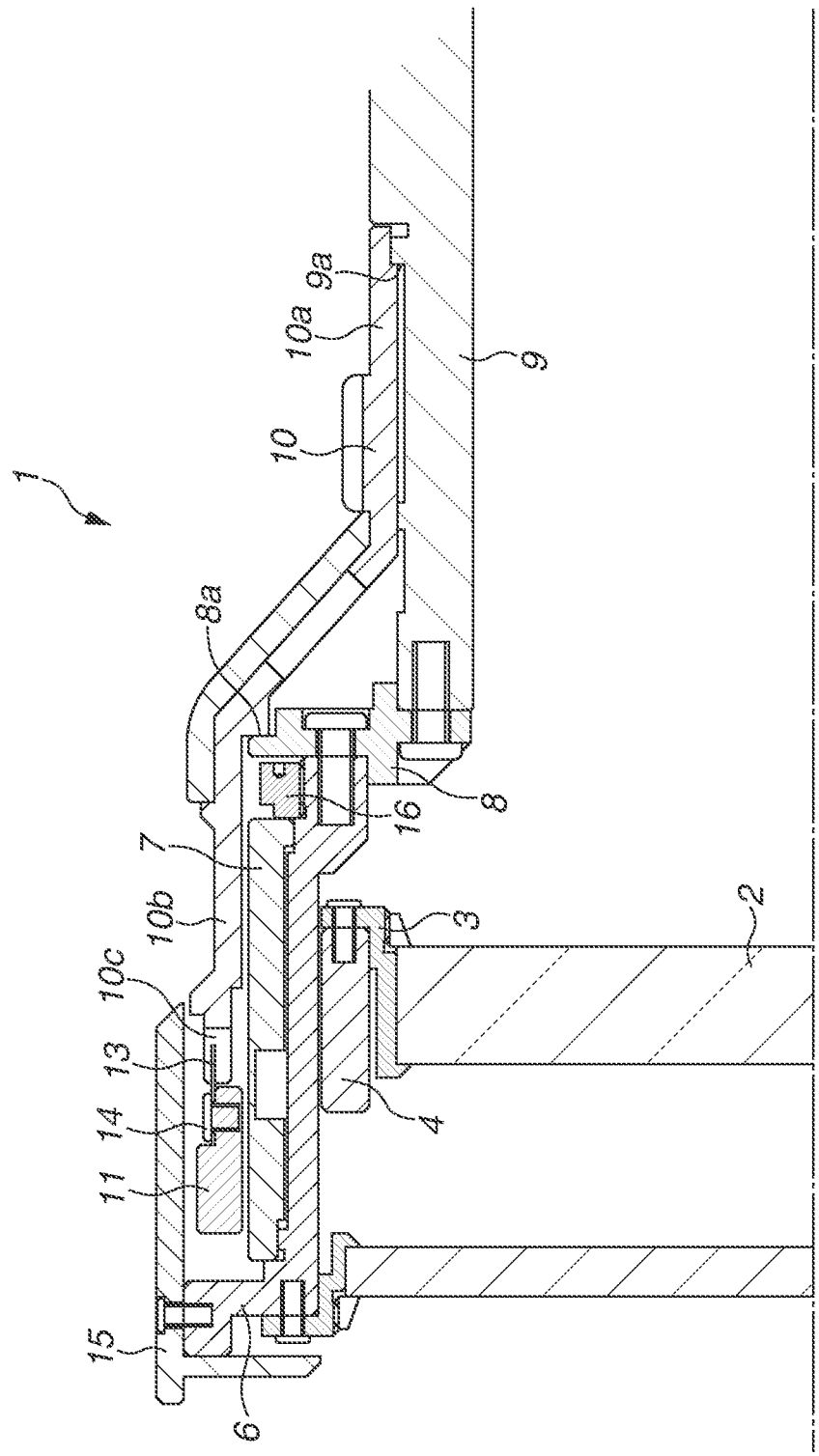
FIG. 2 is a sectional view illustrating the configuration example of the lens apparatus (seen in a section at 90° to the section of FIG. 1).

FIG. 1 is a sectional view illustrating a configuration example of a lens apparatus according to a first exemplary embodiment. FIG. 2 is a sectional view illustrating the configuration example of the lens apparatus (seen in a section at 90° to the section of FIG. 1). In the diagrams, the left side is an object side, and the right side is an image plane side. In the diagrams, a fixed barrel 9 (cylindrical member) is a member to not be driven. The fixed barrel 9 is connected to a coupling part (mount part) of an imaging apparatus (200 in FIG. 5 to be described below) on which a lens apparatus 1 is mounted. The lens apparatus 1 according to the present exemplary embodiment includes an optical element 2 serving as a lens unit for focus adjustment (focusing lens unit). The optical element 2 can continuously change a focal position (object distance) of the lens apparatus 1 by moving along an axis of the fixed barrel 9 or optical axis (horizontally in the diagram). The term "lens unit" shall cover optical elements such as a single lens and a cemented lens. The terms "barrel" and "ring" shall refer to a member that includes, at least in part, a cylindrical or annular portion.

The optical element 2 is held by a movable lens barrel 3. The movable lens barrel 3 is fixed to a movable barrel 4 by screws. Three cam pins 5 (also referred to as cam followers) extending in directions perpendicular to the optical axis are fixed to an outer peripheral portion of the movable barrel 4 at pitches of 120° about the optical axis. The three cam pins 5 are engaged with three pairs of straight grooves 6a and cam grooves 7a, respectively, to be smoothly slidable. The straight grooves 6a are formed in a fixed barrel 6 (first fixed barrel) along the optical axis (axis of the fixed barrel 6, or first axis). The cam grooves 7a are formed in a cam ring 7 fitted onto the outer periphery of the fixed barrel 6. The cam ring 7 is fitted onto the fixed barrel 6 to be smoothly rotatable. Movement of the cam ring 7 along the optical axis is regulated by a cam ring retainer 16 threadedly engaged with the fixed barrel 6. Rotation of the movable barrel 4 about the optical axis is regulated by the engagement of the linear grooves 6a formed in the fixed barrel 6 with the cam pins 5. As the cam ring 7 rotates about the optical axis, the movable barrel 4 moves along the optical axis with the cam pins 5 guided by the cam grooves 7a in the cam ring 7. Since the cam ring 7 thus functions to convert a rotary motion into a linear motion, the cam ring 7 will also be referred to as a rotary-to-linear motion conversion mechanism (conversion mechanism from a rotary motion to a linear motion). The rotary-to-linear motion conversion mechanism includes a cylindrical member that has a helicoid thread and is rotatable about the (optical) axis. In such a case, the movable barrel 4 can have a helicoid thread to be threadedly engaged with the helicoid thread.

The fixed barrel 6 (first fixed barrel) is coupled (fixed) to the fixed barrel 9 (second fixed barrel) via a fixed barrel 8 by screws. An inner peripheral portion (inner surface) of an operation ring 10 (also referred to as an operation member) is fitted onto an outer peripheral portion (outer surface) of the fixed barrel 9. Indexes indicating object distances (also referred to as focus indexes) are inscribed or otherwise attached to an outer peripheral portion 10a of the operation ring 10. The operation ring 10 can be operated to rotate smoothly about the optical axis (axis of the fixed barrel 9, or second axis). The operation ring 10 is sandwiched between a sliding surface 8a of the fixed barrel 8 and a sliding surface 9a of the fixed barrel 9, whereby movement of the operation ring 10 in the optical axis direction is regulated. A part of the operation ring 10 covers an outer side of the cam ring 7. There is a sufficient gap between an inner surface 10b of the operation ring 10 and an outer surface of the cam ring 7 so that the operation ring 10 and the cam ring 7 do not contact each other when rotated with respect to the fixed barrel 9 and the fixed barrel 6, respectively.

A transmission ring 11 is located on the object side of the operation ring 10. There is a sufficient gap between the transmission ring 11 and the outer surface of the cam ring 7, as with the inner surface 10b of the operation ring 10. The transmission ring 11 has through holes 11a (openings) at two opposite positions with the axis of the transmission ring 11 or the optical axis therebetween. Coupling pins 12 are located on the outer surface of the cam ring 7 at two opposite positions with the axis of the cam ring 7 or the optical axis therebetween. The two coupling pins 12 are engaged with the two through holes 11a, respectively. Each coupling pin 12 can include a metal shaft part 12a and a resin part 12b press-fitted onto the shaft part 12a. The resin part 12b may desirably be engaged with the through hole 11a with no play. The two through holes and the two coupling pins are formed or arranged so that either two are in/on the cam ring 7 and the other two in/on the transmission ring 11. Since a pair of through holes 11a and a pair of coupling pins 12 are both located opposite to each other, the transmission ring 11 can move (translate) along the axis of the through holes 11a with respect to the cam ring 7 to which the coupling pins 12 are fixed. Such an axis will be referred to as an axis A.

Figure 3:
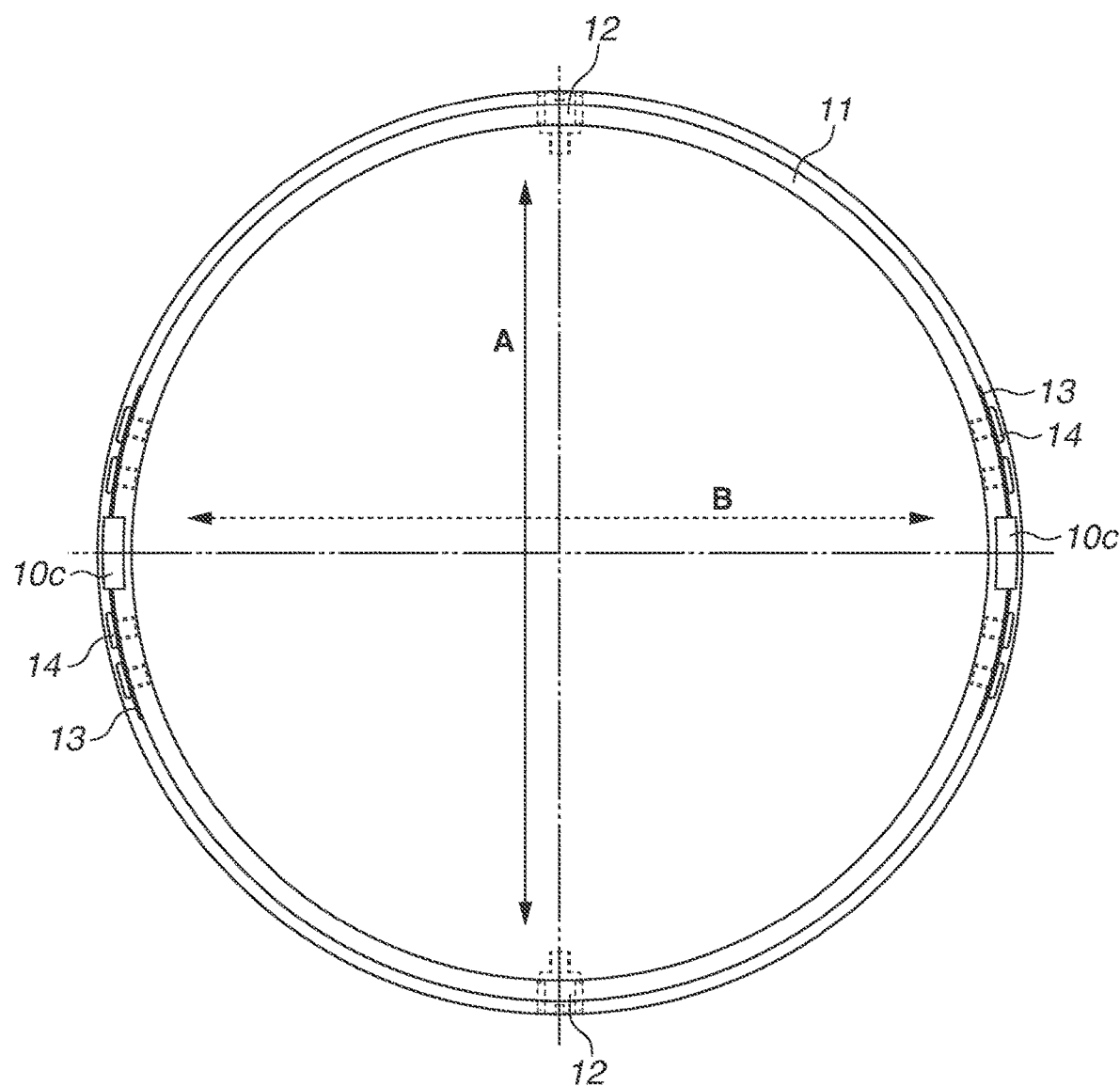
FIG. 3 is a sectional view taken along a cross section C-C of FIG. 1.

FIG. 3 is a sectional view taken along a cross section C-C of FIG. 1. An axis orthogonal to both the optical axis and the axis A will be referred to as an axis B. The axis A and the axis B are not parallel to each other (in different directions) but do not necessarily need to be orthogonal to each other. Plate-shaped coupling pieces 13 (also referred as plate-shaped members or plate-shaped coupling members) are located on the outer peripheral portion of the transmission ring 11 at positions on both sides of axis B so that protrusions 10c on an end of the object side of the operation ring 10 are sandwiched therebetween.

Figure 4:
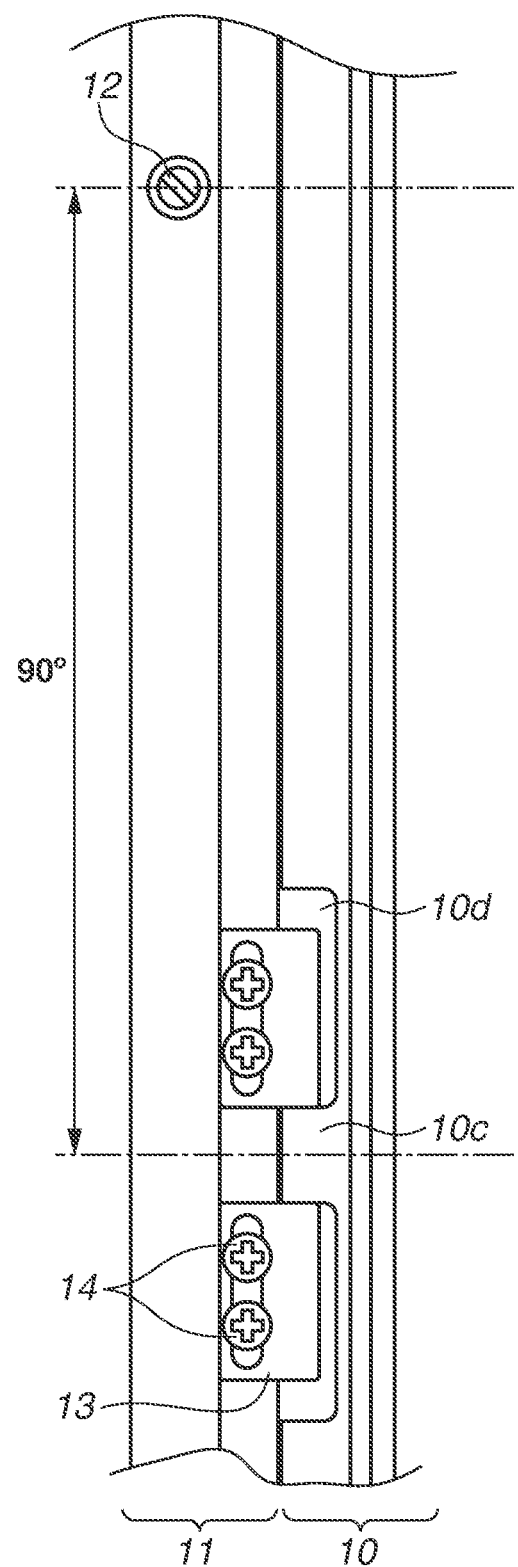
FIG. 4 is a developed view illustrating a configuration example of parts of the lens apparatus.

As illustrated in FIG. 4, each protrusion 10c is formed by a recesses 10d (notch) in an end portion of the operation ring 10. Both side surfaces of the protrusion 10c are formed in parallel with the axis B. The protrusions 10c are located on the end portion of the operation ring 10 at two opposite positions with the axis of the operation ring 10 or the optical axis therebetween. Similarly, two pairs of coupling pieces 13 sandwiching the respective protrusions 10c are located on the outer peripheral portion of the transmission ring 11 at two opposite positions with the axis of the transmission ring 11 or the optical axis therebetween. Each pair of coupling pieces 13 forms an opening in an area corresponding to the protrusion 10c. Each coupling piece 13 is fixed to the transmission ring 11 by two screws 14 inserted into a long hole 13a formed in the coupling piece 13. A pair of coupling pieces 13 sandwiching the protrusion 10c is fixed so that the coupling pieces 13 are abutted against the respective side surfaces of the protrusion 10c with no play. The two protrusions and the two pairs of coupling pieces can be formed or located so that either two are on the operation ring 10 and the other two are on the transmission ring 11. Since the protrusions 10c and the pairs of coupling pieces 13 are both located at two opposite positions as described above, the transmission ring 11 can move (translate) in a direction along the axis B with respect to the operation ring 10 including the protrusions 10c. The transmission ring 11 is thus supported by the rotary-to-linear motion conversion mechanism and the operation member.

The effect of the transmission ring 11 having the foregoing configuration will now be described. The transmission ring 11 can move with respect to the cam ring 7 in (along) the direction along the axis A (first direction). The regulation by the engagement of the through holes 11a with the coupling pins 12 thus determines the position of the transmission ring 11 not in the direction along the axis A but in the other directions. Moreover, the transmission ring 11 can move with respect to the operation ring 10 in (along) the direction along the axis B (second direction). The regulation by the engagement (contact) of the protrusions 10c with the coupling pieces 13 thus determines the position of the transmission ring 11 not in the direction along the axis B but in the other directions. In a case where the position of the cam ring 7 and the position of the operation ring 10 are determined by the engagement of the through holes 11a with the coupling pins 12 and the engagement of the protrusions 10c with the coupling pieces 13, the position of the transmission 11 is therefore determined accordingly. Specifically, the transmission ring 11 can move to a specific position based on the position of the cam ring 7 and the position of the operation ring 10 while rotating with the rotation of the operation ring 10. In other words, even if the cam ring 7 and the operation ring 10 are axially misaligned, the movement of the transmission ring 11 can reduce uneven operation torque and eccentricities of the optical element (parallel eccentricity and tilt eccentricity) due to the misalignment.

A decoration ring 15 (annular member) shaped to cover the transmission ring 11 and the protrusions 10c and recesses 10d at the end of the operation ring 10 is located on an outermost side of the lens apparatus 1. This prevents a user (operator) of the lens apparatus 1 and objects other than the lens apparatus 1 from directly touching the transmission ring 11. The transmission ring 11 is thus less prone to disturbance and can be driven to a specific position based on the position of the cam ring 7 and the position of the operation ring 10.

Now, effects of the lens apparatus 1 according to the present exemplary embodiment having the foregoing configuration will be described. When the user makes a focus adjustment (focusing operation) to the lens apparatus 1, the user rotates the operation ring 10 about the optical axis. In the present exemplary embodiment, the operation ring 10 and the fixed barrel 9 can be fitted with small play compared to a configuration without the transmission ring 11. This can improve operability and an operation feeling of the operation ring 10. A fitting portion between the operation ring 10 and the fixed barrel 9 and a fitting portion between the cam ring 7 and the fixed ring 6 can be axially misaligned because of manufacturing variations of the parts and assembly variations of the parts. Such an axial misalignment is allowed by the movement of the transmission ring 11 as described above. This can reduce excessive load (resistance) due to the axial misalignment, and can reduce force that is transmitted to the cam ring 7 and makes the optical element 2 eccentric other than the rotational force of the operation ring 10. According to the present exemplary embodiment, a lens apparatus advantageous in terms of uniform operation torque can thus be provided.

As the rotational force (rotation) of the operation ring 10 is transmitted to rotate the cam ring 7, the movable barrel 4 and the optical element 2 move along the optical axis as an effect of the engagement of the cam grooves 7a with the cam pins 5. As a result, the focal position (object distance) of the lens apparatus 1 can be adjusted. Since the cam ring 7 and the fixed barrel 6 according to the present exemplary embodiment can be fitted with small play compared to a configuration without the transmission ring 11, the parallel eccentricity and tilt eccentricity of the optical element 2 can be reduced. According to the present exemplary embodiment, a lens apparatus advantageous in terms of optical performance can thus be provided.

Each of the coupling pieces 13 has the long hole 13a in which the screws 14a are inserted. The operation ring 10 and the transmission ring 11 can thus be coupled by adjusting (positioning) a relative arrangement (rotation angle) therebetween in a circumferential direction about the second axis and in a manner such that the arrangement (positioning) is changeable. Specifically, for example, a rotation angle of the cam ring 7 is initially adjusted to locate the optical element 2 at a position where the object distance is infinity. An index indicating infinity on the operation ring 10 is then positioned to an index line on the fixed barrel 9. In such a state, the operation ring 10 and the transmission ring 11 are rotationally coupled to each other by the coupling pieces 13. A lens apparatus advantageous in terms of accuracy of object distances indicated by the focus indexes can thereby be provided.

In the present exemplary embodiment, the transmission ring 11 is described to be located on the object side of the operation ring 10. However, the operation ring 10 and the transmission ring 11 may be arranged so that the two rings overlap in the direction along the optical axis and part of the operation ring 10 covers the outer side of the transmission ring 11. In the present exemplary embodiment, the cam ring 7 and the transmission ring 11 are described to be coupled by the coupling pins 12, and the transmission ring 11 and the operation ring 10 by the plate-shaped coupling pieces 13. However, such coupling structures may be replaced with each other. Moreover, the coupling structures in the direction of the axis A and the direction of the axis B are not limited to mutually different ones. The coupling structures in the directions of the axes A and B may be the same.

In coupling the cam ring 7 with the transmission ring 11 by the plate-shaped coupling pieces 13, the coupling can be established by adjusting (positioning) a relative arrangement (rotation angle) therebetween in the circumferential direction about the first axis and in a manner such that the arrangement (positioning) is changeable. Specifically, for example, the rotation angle of the cam ring 7 is initially adjusted to locate the optical element 2 at a position where the object distance is infinity. The index indicating infinity on the operation ring 10 is then positioned to the index line on the fixed barrel 9. In such a state, the cam ring 7 and the transmission ring 11 are rotationally coupled to each other by the coupling pieces 13. This can also provide a lens apparatus advantageous in terms of the accuracy of the object distances indicated by the focus indexes.

The cam ring 7 and the transmission ring 11 can be coupled by a plate-shaped member (first member) extending along the first axis on either one of the rings and an opening (first opening) formed along the first axis in an end portion of the cylindrical member of the other. Similarly, the operation ring 10 and the transmission ring 11 can be coupled by a plate-shaped member (second member) extending along the second axis on either one of the rings and an opening (second opening) formed along the second axis in an end of the cylindrical member of the other. In the present exemplary embodiment, the coupling structure for allowing an axial misalignment between the cam ring 7 and the operation ring 11 is applied to a driving system of the focusing lens unit. However, this is not restrictive, and the coupling structure can be applied to a driving system of other optical elements such as a zoom lens unit and an aperture stop.

[Exemplary Embodiment of Imaging Apparatus]

Figure 5:
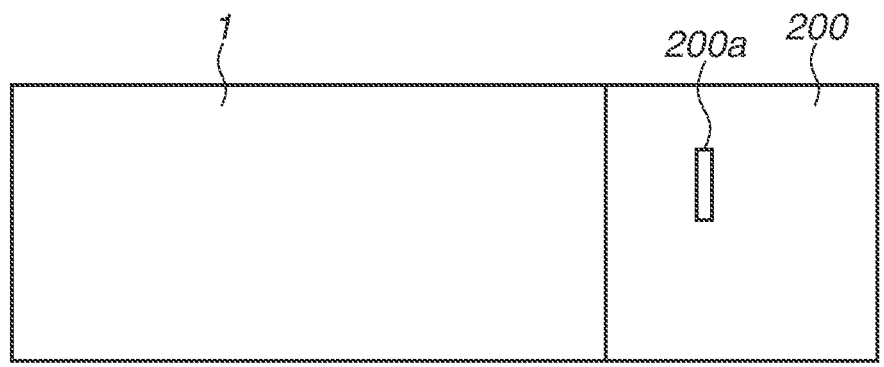
FIG. 5 is a diagram illustrating a configuration example of an imaging apparatus.

FIG. 5 is a diagram illustrating a configuration example of an imaging apparatus. This imaging apparatus can include the lens apparatus 1 described above and an image sensor 200a (camera apparatus (imaging apparatus main body) 200 including the image sensor 200a) that captures an image formed by the lens apparatus 1. In such a case, the lens apparatus 1 can be one that is interchangeably attached to the camera apparatus 200 or one that is not.

It will be understood that while the exemplary embodiments of the disclosure have been described above, the disclosure is not limited to such exemplary embodiments, and various changes and modifications can be made without departing from the gist thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-236837, filed Dec. 26, 2019, which is hereby incorporated by reference herein in its entirety.

What is claimed is:
1. A lens apparatus comprising:
   an optical element;
   a first fixed barrel;
   a second fixed barrel coupled to the first fixed barrel;
   a conversion mechanism from a rotary motion to a linear motion, fitted to the first fixed barrel and configured to be rotated about a first axis as an axis of the first fixed barrel to drive the optical element along the first axis;

an operation member fitted to an outer periphery of the second fixed barrel and configured to be operated to be rotated about a second axis as an axis of the second fixed barrel; and a transmission ring configured to transmit rotation from the operation member to the conversion mechanism, the transmission ring being supported by the conversion mechanism to be translatable in a first direction orthogonal to the first axis and supported by the operation member to be translatable in a second direction orthogonal to the second axis.

2. The lens apparatus according to claim 1, wherein the conversion mechanism is fitted to an outer periphery of the first fixed barrel.

3. The lens apparatus according to claim 1, wherein one of the transmission ring and the conversion mechanism includes a first member extending in the first direction, and a first opening extending in the first direction is formed in the other of the transmission ring and the conversion mechanism, the first member being engaged with the first opening.

4. The lens apparatus according to claim 3, wherein the first member includes a pin, and the first opening is formed as a hole.

5. The lens apparatus according to claim 3, wherein the first member includes a protrusion extending along the first axis on an end of a cylindrical member, and the first opening is formed between two plate members configured to sandwich the protrusion therebetween.

6. The lens apparatus according to claim 3, wherein the first member includes a plate member extending along the first axis, and the first opening is formed in an end of a cylindrical member along the first axis.

7. The lens apparatus according to claim 1, wherein one of the transmission ring and the operation member includes a second member extending in the second direction, and a second opening extending in the second direction is formed in the other of the transmission ring and the operation member, the second member being engaged with the second opening.

8. The lens apparatus according to claim 7, wherein the second member includes a pin, and the second opening is formed as a hole.

9. The lens apparatus according to claim 7, wherein the second member includes a protrusion extending along the second axis on an end of a cylindrical member, and the second opening is formed between two plate members configured to sandwich the protrusion therebetween.

10. The lens apparatus according to claim 7, wherein the second member includes a plate member extending along the second axis, and the second opening is formed in an end of a cylindrical member along the second axis.

11. The lens apparatus according to claim 1, wherein one of the transmission ring and the operation member includes a coupling member configured to couple the operation member and the transmission ring to each other such that arrangement of the operation member relative to the transmission ring in a circumferential direction about the second axis can be changed.

12. The lens apparatus according to claim 11, further comprising a screw configured to position the operation member relative to the transmission ring in the circumferential direction, wherein a slot extending in the circumferential direction is formed in the coupling member, and the screw is inserted in the slot.

13. The lens apparatus according to claim 1, wherein one of the transmission ring and the conversion mechanism includes a coupling member configured to couple the conversion mechanism and the transmission ring to each other such that arrangement of the conversion mechanism relative to the transmission ring in a circumferential direction about the first axis can be changed.

14. The lens apparatus according to claim 13, further comprising a screw configured to position the conversion mechanism relative to the transmission ring in the circumferential direction, wherein a slot extending in the circumferential direction is formed in the coupling member, and the screw is inserted in the slot.

15. The lens apparatus according to claim 1, further comprising an annular member configured to cover an outer periphery of the transmission ring.

16. The lens apparatus according to claim 1, wherein the optical element includes a lens unit.

17. An image pickup apparatus comprising:
a lens apparatus; and
an image pickup element configured to pick up an image formed by the lens apparatus,
wherein the lens apparatus includes
an optical element,
a first fixed barrel,
a second fixed barrel coupled to the first fixed barrel,
a conversion mechanism from a rotary motion to a linear motion, fitted to the first fixed barrel and configured to be rotated about a first axis as an axis of the first fixed barrel to drive the optical element along the first axis;
an operation member fitted to an outer periphery of the second fixed barrel and configured to be operated to be rotated about a second axis as an axis of the second fixed barrel; and
a transmission ring configured to transmit rotation from the operation member to the conversion mechanism, the transmission ring being supported by the conversion mechanism to be translatable in a first direction orthogonal to the first axis and supported by the operation member to be translatable in a second direction orthogonal to the second axis.

18. The image pickup apparatus according to claim 17, wherein the conversion mechanism is fitted to an outer periphery of the first fixed barrel.

19. The image pickup apparatus according to claim 17, wherein one of the transmission ring and the conversion mechanism includes a first member extending in the first direction, and a first opening extending in the first direction is formed in the other of the transmission ring and the conversion mechanism, the first member being engaged with the first opening.

20. The image pickup apparatus according to claim 17, wherein one of the transmission ring and the operation member includes a second member extending in the second direction, and a second opening extending in the second direction is formed in the other of the transmission ring and the operation member, the second member being engaged with the second opening.

* * * * *